United States Patent [19]

Glover

[11] 4,275,522
[45] Jun. 30, 1981

[54] BAIT BOX WITH PASSIVE CIRCULATION

[76] Inventor: William T. Glover, 4467 New Haven Ave., West Melbourne, Fla. 32901

[21] Appl. No.: 24,874

[22] Filed: Mar. 28, 1979

[51] Int. Cl.$^3$ .............................................. A01K 97/04
[52] U.S. Cl. ....................................... 43/56; 137/579; 261/121 M
[58] Field of Search ................ 43/55, 56, 57; 114/255; 261/121 M; 137/579

[56] References Cited

U.S. PATENT DOCUMENTS

| | | | |
|---|---|---|---|
| 2,151,225 | 3/1939 | Newton | 43/55 |
| 2,526,520 | 10/1950 | Von Saspe | 137/579 X |
| 2,738,613 | 3/1956 | Styer | 43/56 |
| 2,966,002 | 12/1960 | Hobson | 43/55 |
| 3,040,469 | 6/1962 | Richards | 43/56 |
| 3,196,576 | 7/1965 | Thomas | 43/56 |
| 3,304,645 | 2/1967 | Hardesty | 43/55 |
| 3,797,160 | 3/1974 | Lewis | 43/55 |
| 4,033,280 | 7/1977 | Wood | 114/255 |

FOREIGN PATENT DOCUMENTS 616176  3/1960  Canada ......................................... 43/57

Primary Examiner—Gary L. Smith
Assistant Examiner—Robert P. Olszewski

[57] ABSTRACT

This application discloses a bait box of the type having passive circulation of water or air therethrough in order to provide fresh, oxygenated water for fish or live bait stored therein. A collector and a siphon tube are provided for mounting below the water line of the boat. Additional flexible tubing is coupled thereto in order to guide the flow of water between the tubes and a container. The container includes a plurality of compartments through which the water is circulated. Adjustable inlet and outlet devices are coupled to the flexible tubes for circulating the water throughout the container. An air scoop is also provided for oxygenating the water within the container by inserting air under pressure therein.

12 Claims, 4 Drawing Figures

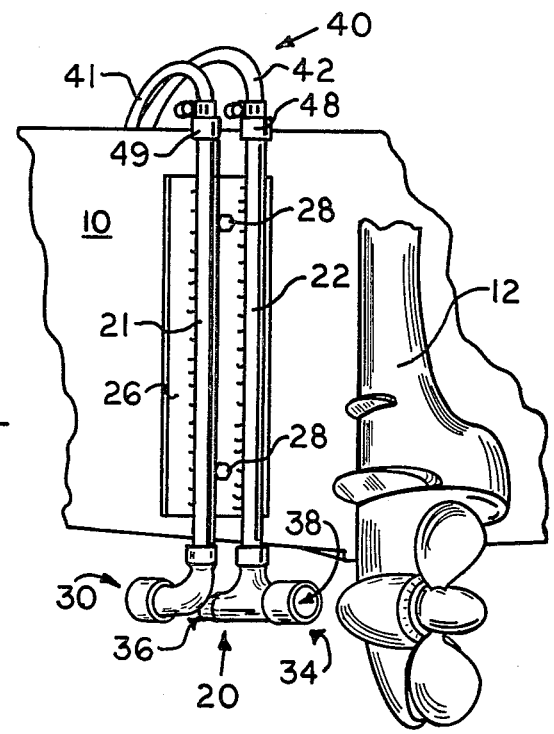
FIG. 1
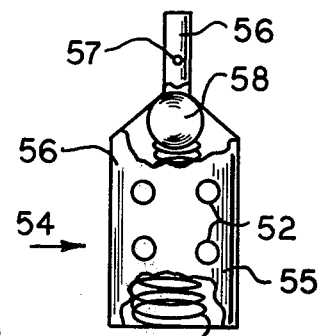
FIG. 3
FIG. 4
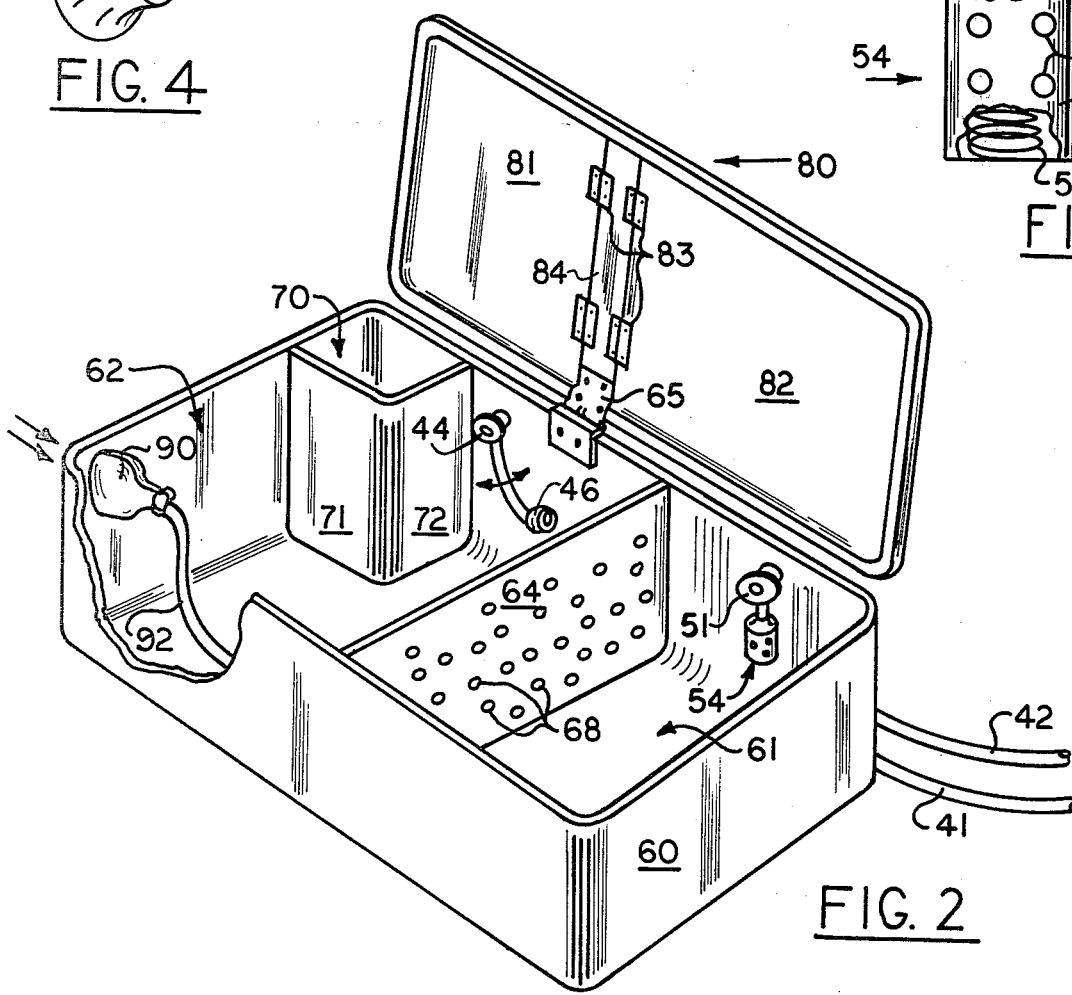
FIG. 2

BAIT BOX WITH PASSIVE CIRCULATION

BACKGROUND OF THE INVENTION

I. Field of the Invention

The present invention relates to bait boxes of the type used on small fishing boats, and more particularly to bait boxes of the type used for live fishing bait which require continuously fresh and oxygenated water for survival.

II. Brief Description of the Prior Art

The typical angler is familiar with the problems of keeping shrimp, minnows and other bait alive and active during long periods of fishing. When large numbers of these bait animals are confined to a relatively small area, they quickly deplete the oxygen supply within the container and become sluggish in their movement or die. These generally inactive bait animals are not nearly as desirable to the fish as fresh bait, and therefore after long periods of fishing the "luck" of the angler generally subsides.

Other inventors have approached this problem by providing pumps which circulate water through the bait box and thereby provide fresh, oxygenated water for consumption by the bait. However, the use of expensive and troublesome pumps or motors in systems of this type greatly increases their cost. Furthermore, the noise produced by these active devices often disturbs the fish to the point where the fish will not come near the boat.

Some inventors have also utilized recessed ram ports within the hull of the boat for collecting small quantities of water under pressure and depositing this water within bait containers. However, the use of any ram water collector which requires an additional opening within the hull of the boat tends to produce breaches in the structural integrity and watertight nature of the hull and thus causes great concern to the angler. The use of such inset ram water collectors within the hull of the boat furthermore limits the portability of the bait box and prevents its use within various types and styles of boats.

In contrast to these unsuccessful and expensive efforts, the present invention employs a ram water collector which may be removably mounted to the side or the stern of the boat for collecting water and transporting the water to an input device which empties into the bait box container. An output device is likewise coupled to the bait box container and is connected through flexible tubing to a suction device which is mounted generally adjacent to the ram collector. The suction device is oriented in order to collect and withdraw water from within the container as the boat travels over the body of water. In this manner no expensive or troublesome pumps or other active devices are required in order to circulate the fresh water through the bait box.

The present invention may also include an air scoop or ram air device for collecting air under pressure and passing it through the water within the container in order to increase the oxygen content thereof. The angler need only to orient the air scoop generally against the flow of air as the boat moves over the body of water or in the alternative is being towed on a trailer behind an automobile.

SUMMARY OF THE INVENTION

The present invention relates to a removable storage box of the type used on boats for storing fish, bait and the like. This storage box comprises a container for receiving and storing water and the bait therein. A ram-type device is provided for being coupled to the boat for collecting water under pressure as the boat is propelled through the water. The collected water is guided through flexible tubing, through a flow regulator and then into the container. Another section of flexible tubing is coupled to the container for removing the water therefrom by suction. The suction is provided from a device which may be removably coupled to the boat at a point generally below the water line and which is oriented generally with the flow as the boat is propelled over the surface of the body of water.

BRIEF DESCRIPTION OF THE DRAWINGS

Other objects, features and advantages of the present invention will be apparent from a study of the written description and the drawings in which:

FIG. 1 illustrates a rare perspective view of a typical outboard motorboat to which is coupled the ram-type water collector and the suction device in accordance with the present invention.

FIG. 2 illustrates a top perspective view of a first preferred embodiment of the bait box container in accordance with the teachings of the present invention.

FIG. 3 illustrates a frontal partially cross-section elevation of an automatic regulator device for limiting the water level within the container.

FIG. 4 illustrates a ram air scoop of the type which may be coupled to the water collector system for non-aquatic operation.

In these drawings, like reference characters refer to like parts throughout the several views of each of the embodiments of the present invention. However, variations and modifications may be effected without departing from the spirit or scope of the concepts of the disclosure and the appended claims. It should also be observed that the elements and operation of the embodiments of the present invention have been illustrated in somewhat simplified form in each of the drawings and in the specification in order to eliminate unnecessary details which would be apparent to one skilled in this art.

DETAILED DESCRIPTION OF THE PREFERRED EMBODIMENT

The present invention relates to a bait storage box of the type having passive circulation of fresh, aerated water therethrough. A first preferred embodiment of the present invention is illustrated in FIGS. 1 and 2. The invention includes a circulator device, illustrated generally as 20, which is removably coupled by two bolts 28 to the stern 10 of a boat. The circulator 20 is illustrated as being located generally adjacent to the outboard motor 12, but the circulator 20 could be moved to the side of the boat or to another section of the stern as long as the operative portions thereof are mounted below the water line as the boat passes over the body of water.

The circulator 20 includes a first tube 21 and a second tube 22. The first tube 21 is generally referred to as the collector tube and the second tube 22 is generally referred to as the suction or siphon tube. Both the first tube and the second tube are secured to the mounting plate 26 by welding or some other permanent means.

With specific attention to the collector tube 21, a lower end thereof is formed in a 90° elbow which includes at a distended end thereof an enlarged opening port or collector 30. While an enlarged collector and port 30 are illustrated in FIG. 1, a smaller or non-enlarged collector port may also be used but with somewhat reduced collection capacity. The plane of this collector port 30 is oriented generally perpendicular to and opposed to the flow of water as the boat passes over the body of water. In this manner water is ingested under pressure through the collector port 30 and passes through the first tube 21.

A set of flexible and generally clear plastic tubing, shown generally as 40 in FIGS. 1 and 2, includes a first flexible tube 41 which is coupled by a removable coupling 49 to the top section of the first tube 21, and a second flexible tube 42 which is coupled by a removable coupler 48 to the top end of the second tube 22. With specific reference to FIG. 2, the first flexible tube 41 operably couples with an input valve 51 which communicates through the generally upstanding side walls of a container 60. The input valve 51 may be completely closed in order to prevent the flow of the pressurized water into the container, or the input valve may be opened either fully or partially for regulating the flow of water.

A safety valve, illustrated generally as 54 in FIGS. 2 and 3, may be operably coupled to the input valve 51 in order to prevent the water from completely filling and then overflowing the container 60, even if the input valve 51 is left fully open. As illustrated generally in FIG. 3, the safety valve 54 includes a generally hollow housing 55 which includes at an upper extremity thereof a neck section 56 which is coupled to the input valve 51. A floating ball 58 is restrained within the housing 55 and is buoyantly supported adjacent to the neck section 56 when the level of the water within the container 60 rises above the neck 56. The size of the floating ball 58 and the neck 56 are determined such that the ball 58 generally cuts off the flow of water from the input valve 51 into the housing 55 and thereafter into the container 60 through apertures 52.

The water which is flowing through the input valve 51 is under pressure as derived from the collector port 30, and thus will displace the floating ball 58 downwardly even though the water level within the container 60 is slightly above the neck section 56. However, the buoyancy of the ball 58 may be chosen such that the buoyant forces exerted on the ball, together with the force exerted by a coiled spring 53 will balance the typical water pressure at a point where the water level is only several inches above the neck 56. Therefore, this balancing of pressures will effectively prevent the flow of water from the input valve 51 and through the housing 55. The buoyancy of the floating ball 58 and the size of the spring 53 may be determined for various different levels of water within the container 60 as required. A small anti-siphon hole 57 may also be provided above the neck 57.

An exhaust valve, illustrated generally as 44 in FIG. 2, includes a fitting which communicates through the rear upstanding side wall of the container 60. A generally curved piece of inflexible tubing 46 is coupled to the exhaust valve 44 so as to be pivotable in a generally vertical plane. The precise level of the distended end of the tube 46 may be adjusted by rotating this tube about the exhaust valve 44. The exhaust valve 44 is coupled through the second flexible tube 42 to the second tube 22.

With reference to FIG. 1, the lower distended end of the second tube 22 includes a generally T-shaped fitting 34 which is open at both the front end 36 and the rear end 38 thereof. The front opening 36 is slightly smaller than the rear opening 38. As the boat moves across the body of water, the water may flow into the intake end 36 and out the exhaust end 38 of the T-shaped fitting 34 and thus create a suction which draws the water out of the second tube 22. Since the second tube 22 is coupled to the exhaust valve 44, the suction may be used to draw off water from the container 60 and to deposit the water within the body of water as the result of the motion of the boat. While a generally T-shaped suction or siphon fitting 34 has been illustrated in FIG. 1, it may also be possible to use a siphon fitting of the type used for the collector and collector port 30 by merely reversing the direction of attachment such that the exhaust port 38 of the fitting is generally perpendicular to but not opposed to the flow of water past the boat.

A first preferred embodiment of the container is shown generally as 60 in FIG. 2. The container includes four generally upstanding sides which define a void therein. The large void may be divided into several different compartments, such as 61 and 62, by placing one or more perforated dividers 64 into appropriately positioned slots positioned vertically along the inside of the front and rear vertical walls of the container 60. The divider 64 includes a plurality of apertures 68 therein for allowing the flow of water from the input valve 51 to the exhaust valve 44, while at the same time preventing the migration of the bait or other articles within the container 60 from one compartment to another. While only one perforated divider 64 is illustrated, it will be understood that many different dividers may be simultaneously placed within the void defined within the container 60.

In a first preferred embodiment of the present invention a watertight void, shown generally as 70 in FIG. 2, is defined within one of the compartments 62. The watertight compartment 70 is defined by a first generally upstanding wall 71 and a second generally upstanding wall 72, as well as the side and rear upstanding sides of the container 60. The walls 71 and 72 may communicate with the bottom of the container 60, but in any event they must reach upwardly to a point generally adjacent to the top of the upstanding sides of the container 60. This storage compartment 70 may be used for storing worms or other types of bait which cannot survive in the water environment or other articles which the angler desires to keep dry.

A top, shown generally as 80 in FIG. 2, includes a center top section 84 which is movably coupled to the rear upstanding side of the container 60 by a hinge 65. A first side top section 81 and a second side top section 82 are movably coupled to the center top section 84 by a plurality of hinges 83. The orientation of the hinges 83 is such that when the center top section 84 is closed, the first side top section 81 and the second side top section 82 may each be opened into a generally upstanding position which makes them generally adjacent to and parallel with each other. In this manner, or separately, the angler can have access to each of the separate compartments 61 or 62 within the container 60 without disturbing the other compartment.

An air scoop, shown generally as 90, is attached to an inside surface of one of the upstanding sides of the container 60. The air scoop 90 includes a large opening (not shown) in the outside surface of the upstanding side, with the scoop 90 then narrowing to a smaller restricted area for providing a ram air effect for pressurizing the flow of the air through this scoop and out a flexible tube 92 coupled thereto. If the container 60 is oriented with the air scoop 90 generally facing and opposing the flow of air produced by the boat moving over the body of water, or perhaps by the boat moving on a trailer being towed behind a car, then the pressurized air will escape the tubing 90 and will aerate the water within the container 60. In this manner aeration will be provided to the water stored within the container 60 even when it is not possible to circulate water therethrough.

An alternative embodiment 94 of an air scoop is illustrated in FIG. 4. This air scoop 94 is designed to be removably coupled to the distended end or collector part 30 of the first tube 21 in order to receive therethrough air under pressure provided as the boat is towed by an automotive vehicle. The air scoop 94 may be removed before the boat is placed in the water.

Various arrangements of the container 60 may be provided depending upon the specific application in question. For example, one of the compartments, such as 62, may be used for storing minnows or live shrimp, while the second compartment 61 may be utilized for retaining the live fish or lobsters which are caught by the angler. If multiple perforated dividers 64 are inserted within the container 60, the various compartments could be utilized to store different types of exotic fish which may attack each other if not separated.

The operation of the first preferred embodiment of the present invention will now be described with reference to FIGS. 1 and 2. First, the angler inserts the perforated dividers 64 at the appropriate locations within the void defined by the container 60. Water may be added to the container 60 to the desired level. Then, the live bait, such as shrimp or minnows, may be added to the second compartment 62 for transportation to the fishing site. The container 60 is then placed within the transportation vehicle which is preferably an open boat being towed behind an automobile or truck. The large opening of the air scoop 90 is preferably oriented so as to receive the full force of the air as the vehicle and the container 60 are towed to the fishing location. The ram air pressure produced by the air flowing into the air scoop 90 will force the air out the tubing 92 and into the water within the void 62 of the container 60. In this manner additional aeration will be provided to improve the movement of the shrimp or minnows contained within the second compartment 62. The same effect would be produced by coupling the air scoop 94 to the collector part 30 of the first tube 21.

When the fishermen arrive at the fishing location and the boat 10 is removed from the trailer and into the body of water, the fishermen may then secure the circulator 20 to the stern of the boat 10 if it has not already been attached. If convenience and portability are required, the mounting plate 26 may be coupled to the stern of the boat 10 with a C-shaped clamp which is tightened by use of a butterfly-type bolt. The angler must be careful to make sure that the distended ends of both the first tube 21 and the second tube 22 are located sufficiently below the bottom of the boat so as to receive the full force of the water thereupon as the boat travels over the body of water.

As the boat is propelled across the body of water by the motor 12, the angler may open the input valve 51 so as to ingest water through the collector port 30, through the first tube 21, through the first flexible tube 41, through the input valve 51 and through the safety valve 54 for raising the level of water within the container 60. The water level may be adjusted by vertically rotating the exhaust valve tube 46 so that the distended end thereof is equal in level to the desired water level within the container 60. The suction produced by the operation of the suction siphon 34 will then draw excess water through the exhaust valve tube 46, the exhaust valve 44, the second flexible tube 42 and the second tube 22. This waste water will be drawn from the second tube 22 by the siphon or suction forces produced by the action of the water flowing around the suction fitting 34. The water level within the container 60 will not be allowed to overflow the top edges thereof by the operation of the safety valve 54 as previously discussed.

Additional aeration of the water within the container 60 may be provided by orienting the side surface of the container 60 which includes the open mouth section of the air scoop 90 into the force of the wind produced by the boat moving through the water.

When the angler catches a fish, he merely opens the side top section 82 and deposits the fish within the compartment 62 of the container 60. The angler may then open the side top section 81 in order to obtain the fresh and live bait contained within the compartment 62. In this manner the angler can be assured that the bait will remain well oxygenated and lively, and furthermore that the fish which are caught will not die from oxygen starvation and will not consume the bait within the container.

The siphon tube 22 together with the second flexible tube 42 may also be used, without the bait storage box 60, as a boat bailer by placing the distended end of the second flexible tube 42 under the water collected within the well of the boat. As the boat is propelled over the body of water, the suction induced within the siphon tube 22 will withdraw the water from the boat.

While a portable bait box 60 has been illustrated, the concepts of the present invention may also be applied to non-portable bait boxes which are permanently formed or mounted within the boat.

In accordance with the provisions of the United States Patent Laws, a particular preferred embodiment of the present invention has been described in detail. The principles of the invention have been described in the best mode in which it is now contemplated that such principles may be applied. However, it will be understood that the constructions shown and described in the attached specification and the drawings are merely illustrative and that the invention is not limited thereto. Accordingly, alterations and modifications which readily suggest themselves to persons skilled in the art, without departing from the true spirit of the disclosure herein, are intended to be included in the scope of the following claims.

I claim:

1. A passive circulation storage box of the type used on boats for storing fish, bait and the like, comprising in combination:

a container for receiving and storing water therein;

first and second tubes extending below the bottom of the boat;

said first tube having a first end thereof oriented for collecting water under pressure as the boat moves through the body of water;

said second tube having a first end thereof oriected so as to siphon water therefrom;

first valve means coupled to a second end of said first tube for regulating the flow of water into said container, said first valve means including means for sensing the level of water in said container and for regulating the flow of water therethrough so as to retain a predetermined level of water within said container; and wherein a second end of said second tube movably couples through said container so as to be adjustable in vertical level for siphoning water therefrom.

2. The bait storage box as described in claim 1 further including first means for removably coupling to said first end of said first tube for operatively increasing the effective capture area thereof, whereby said first means may be attached for supplying additional air under pressure through said first tube and into the water within said container when the boat is being transported on land.

3. The boat storage box as described in claim 2 wherein said first means comprises a cone having a larger open end and a smaller open end for removably coupling with said first end of said first tube.

4. The bait storage box as described in claim 1 wherein said sensing means comprises a float which is buoyantly supported within a float receptacle for operatively blocking the flow of water through said first tube.

5. The bait storage box as described in claim 1 wherein said container further defines a water-tight storage compartment having a lower section submerged under the water and an upper opening generally adjacent said top for cooperating with said top so as to form an enclosed and generally water-tight void therein.

6. The bait storage box as described in claim 5 wherein said lower section defines at least one half the volume of said storage compartment.

7. The bait storage box as described in claim 1 wherein said first end of said first tube has an enlarged area as compared to the cross-section area of said first tube, thereby collecting the water under additional pressure as the boat moves through the body of water.

8. The bait storage box as described in claim 1 wherein said first end of said second tube has an enlarged area as compared to the cross-section area of said second tube for increasing the siphoning effect on the water from within said second tube.

9. The bait container as described in claim 5 wherein said container further includes a perforated divider for being coupled within said container for separating the water therein into multiple compartments while enabling the flow of water therebetween.

10. The bait storage box as described in claim 6 wherein said storage box further includes:

a channel for guiding air into the water within said container; and scoop means operably coupled to said channel for collecting and coupling pressurized air into said channel, whereby said scoop means may be oriented into the flow of air across said container for providing additional aeration for water therewithin.

11. The bait storage box as described in claim 10 wherein said scoop means comprises a cavity recessed within said container and having a large open mouth area formed into a side surface of said container.

12. The bait storage box as described in claim 1 wherein said container includes a movable top comprising a center top section which is movably coupled to an adjacent section of said container, with said top also including at least two side top sections movably hinged to said center top section for folding upwardly so as to be generally parallel and adjacent each other when opened.

* * * * *